United States Patent [19]
Nakamura

[11] Patent Number: 5,182,510
[45] Date of Patent: Jan. 26, 1993

[54] CHARGING SYSTEM

[75] Inventor: Kazuhiro Nakamura, Shizuoka, Japan

[73] Assignee: Sanshin Kogyo Kabushiki Kaisha, Shizuoka, Japan

[21] Appl. No.: 527,003

[22] Filed: May 22, 1990

[30] Foreign Application Priority Data

May 22, 1989 [JP] Japan .................................. 1-128226

[51] Int. Cl.⁵ ............................................ H02P 9/30
[52] U.S. Cl. ........................................ 322/21; 322/28;
  322/90; 322/94; 320/57; 320/59; 320/DIG. 2
[58] Field of Search ....................... 322/28, 90, 94, 22, 322/21; 320/57, 59, DIG. 2

[56] References Cited

U.S. PATENT DOCUMENTS

| | | | |
|---|---|---|---|
| 2,992,382 | 7/1961 | Hetzler et al. | 322/25 |
| 3,716,774 | 2/1973 | Lace | 320/28 |
| 4,426,613 | 1/1984 | Mizuno et al. | 322/21 |
| 4,959,577 | 9/1990 | Radanski | 322/28 |

Primary Examiner—Steven L. Stephan
Assistant Examiner—Thomas M. Dougherty
Attorney, Agent, or Firm—Ernest A. Beutler

[57] ABSTRACT

A system for charging a battery from a generator including a rectifier regulator wherein the regulated voltage is stepped up to compensate for voltage drops in the cable connecting the rectifier regulator to the battery.

5 Claims, 4 Drawing Sheets

CHARGING SYSTEM

BACKGROUND OF THE INVENTION

This invention relates to a charging system and more particularly to an improved system for charging a battery from a generator that will insure that the battery is charged rapidly.

It is well known to employ a battery charging system in various arrangements such as vehicles including water vehicles. The battery is charged from an engine driven generator which outputs a charge to the battery through a rectifier and voltage regulator. The voltage regulator acts to insure that the battery will not be overcharged and also to insure that the battery is charged as rapidly as practical. However, in many vehicle applications, the battery is located at a considerable distance from the generator. This type of arrangement is quite typical in water vehicles wherein the battery may be located quite remotely from the engine and generator driven by the engine.

Because of the use of such long cables, there is a voltage drop through the cables and a substantial voltage difference between the output of the rectifier regulator and the battery. As a result, the control of the charging current begins before the battery is appropriately charged. Thus, with conventional systems, there is a distinct possibility not only that the battery will not be fully charged, but also that the time at which it is brought up to a charge is unnecessarily lengthened.

It is, therefore, an object of this invention to provide an improved system for charging a battery.

It is a further object of this invention to provide a battery charging system that is capable of compensating for the voltage drop in the lead from the rectifier regulator to the battery so as to improve battery charging efficiency.

SUMMARY OF THE INVENTION

This invention is adapted to be embodied in a system for charging a battery from a generator. The system includes a rectifier regulator for rectifying and regulating the voltage from the generator to charge the battery. Cable means interconnect the output of the rectifier regulator to the battery. Means are provided for measuring the output voltage of the rectifier regulator and the charging current in the cable. Means then increase the voltage output from the regulator rectifier to compensate for the voltage drop in the cable to decrease the time required to bring the battery to a full state of charge.

DETAILED DESCRIPTION OF THE PREFERRED EMBODIMENT OF THE INVENTION

Figure 1:
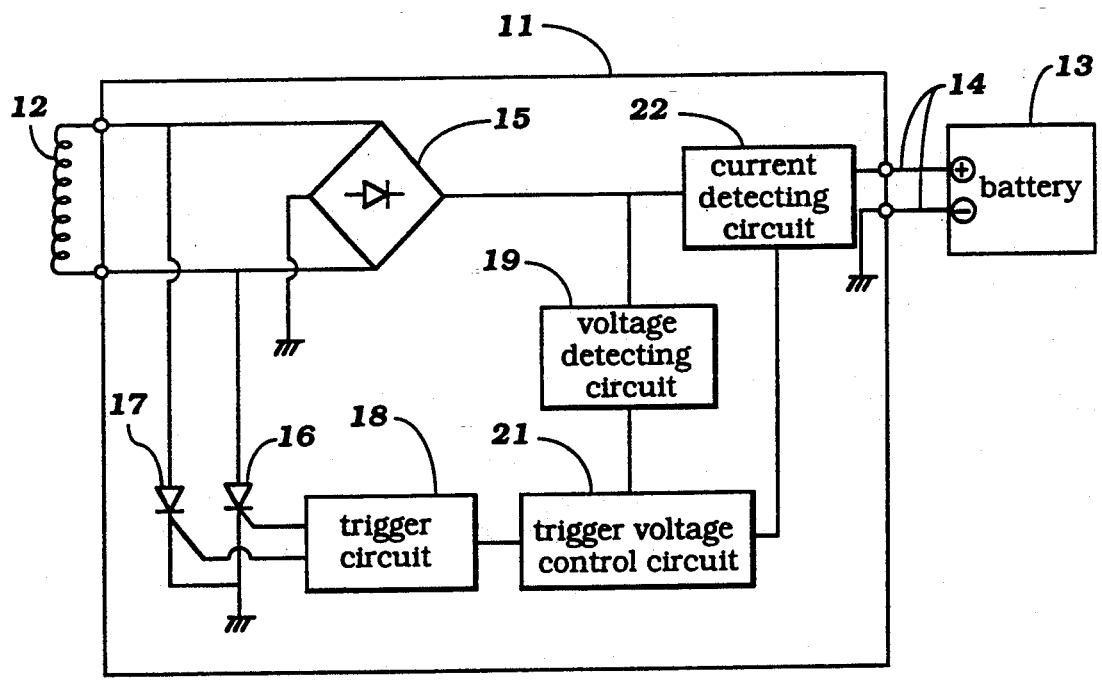
FIG. 1 is a circuit diagram showing the charging system for a battery constructed in accordance with an embodiment of the invention.

Referring in detail first to FIG. 1, a full wave voltage rectifier regulator constructed in accordance with an embodiment of the invention is identified generally by the reference numeral 11. The rectifier regulator 11 is designed to be interposed between a charging coil 12 of a magneto generator or alternator driven by an internal combustion engine (not shown) for charging a battery 13. The voltage rectifier regulator 11 has output terminals that are connected to the battery 13 by means of elongated cables 14 which are shortened in FIG. 1 for the sake of illustration. The length of these cables may vary from application to application, but in most marine applications, wherein the invention has particular utility, the cables 14 will be quite long.

Figure 2:
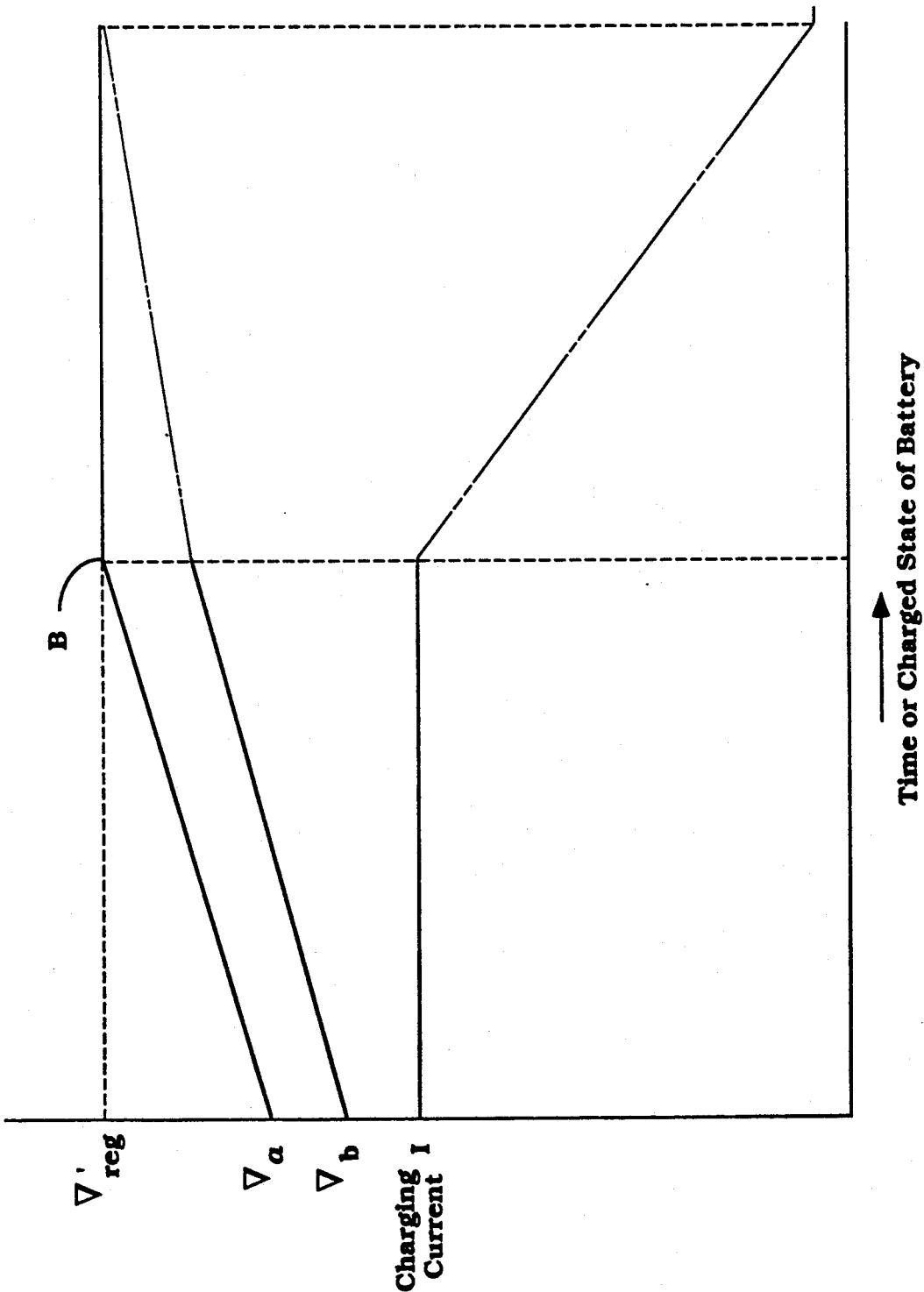
FIG. 2 is a graphic view showing voltage and current outputs in a conventional charging system and the time required and state of charge for the associated battery.

As is conventional, the rectifier regulator includes a diode bridge 15 that rectifies the output voltage from the generator coil 12. The diode bridge has connected across its branches a pair of thyristors 16 and 17 which are switched by a trigger circuit 18 to control the voltage output of the diode bridge 15 that is transmitted to the battery 13. This controls the charging voltage. FIG. 2 illustrates how the typical prior art type of rectifier regulator operates.

In FIG. 2, the charging current I, regulated voltage $V'_{reg}$, output voltage $V_a$ of the diode bridge 15 and charged voltage state $V_b$ of the battery are depicted in relation to time or charged state of the battery. The conventional device operates so that the voltage output of the diode bridge $V_a$ rises until the regulated voltage $V'_{reg}$ is reached at the point B. When this occurs, the voltage is maintained constant at this point and the charging current of the battery will then gradually fall off until the battery reaches the full charged state $V'_{reg}$ at a fairly long period of time. The reason for the long delay in charging up the battery is due to the voltage drop in the cables 14. In accordance with the invention, there is provided a system wherein the voltage set by the voltage regulator is increased over $V'_{reg}$ so as to compensate for the voltage drop in the cables.

Figure 4:
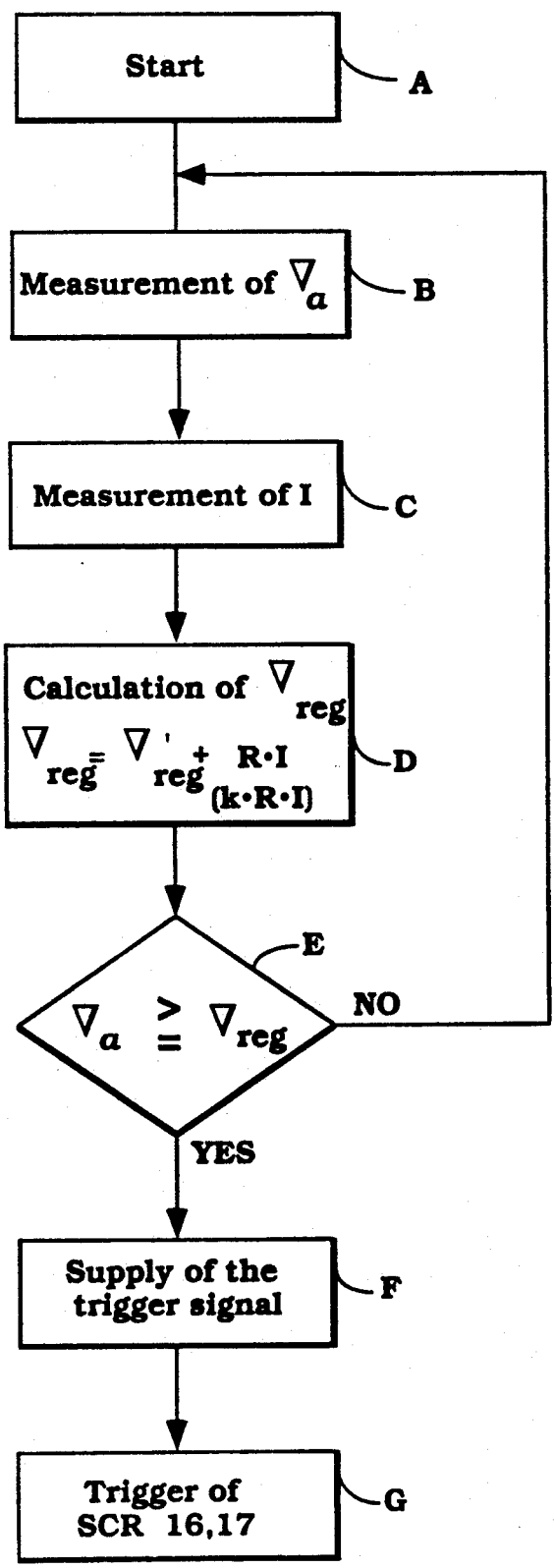
FIG. 4 is a block diagram showing the scheme of operation of this embodiment of the invention.

Referring again to FIG. 1, it should be noted that the regulator rectifier 11 includes, the conventional voltage detecting circuit 19, which outputs a voltage signal to a trigger voltage control circuit 21 which, in turn, outputs a signal to the trigger circuit 18 to change the state of the thyristors 16 and 17 and regulate the output voltage of the diode bridge 15. However, in accordance with the invention, there is also provided a current detecting circuit 22 that is interposed between the diode bridge 15 and one of the cables 14 so as to sense the current flowing in the circuit. It is then possible knowing the length of the cables to calculate the necessary voltage $V_{reg}$ to compensate for this voltage drop. FIG. 4 is a block diagram showing how this calculation is made.

The program starts at the step A and then progresses to the step B to measure the output voltage of the diode bridge by means of the voltage detecting circuit 19. This calculates $V_a$. The current detecting circuit 22 then measures the charging current I at the step C. The circuit 21 then provides a calculation of the $V_{reg}$ to be set at the step D by the equation $V_{reg} = V_a + k \cdot R \cdot I$. k is a constant and R is the line resistance between the rectifier regulator 11 and battery 13. That is, this is the resistance of the cable 14.

The circuit 21 then moves to the step E to determine if the charging voltage $V_a$ is greater than or equal to the regulated voltage $V_{reg}$. If the charging voltage is less than the regulated voltage, the program moves back to the step B. If, however, the voltage $V_a$ exceeds $V_{reg}$, then the program moves the step F wherein the trigger circuit 18 supplies the trigger signal to the thyristors 16 and 17 and triggers them at the step G to maintain the regulated voltage.

Figure 3:
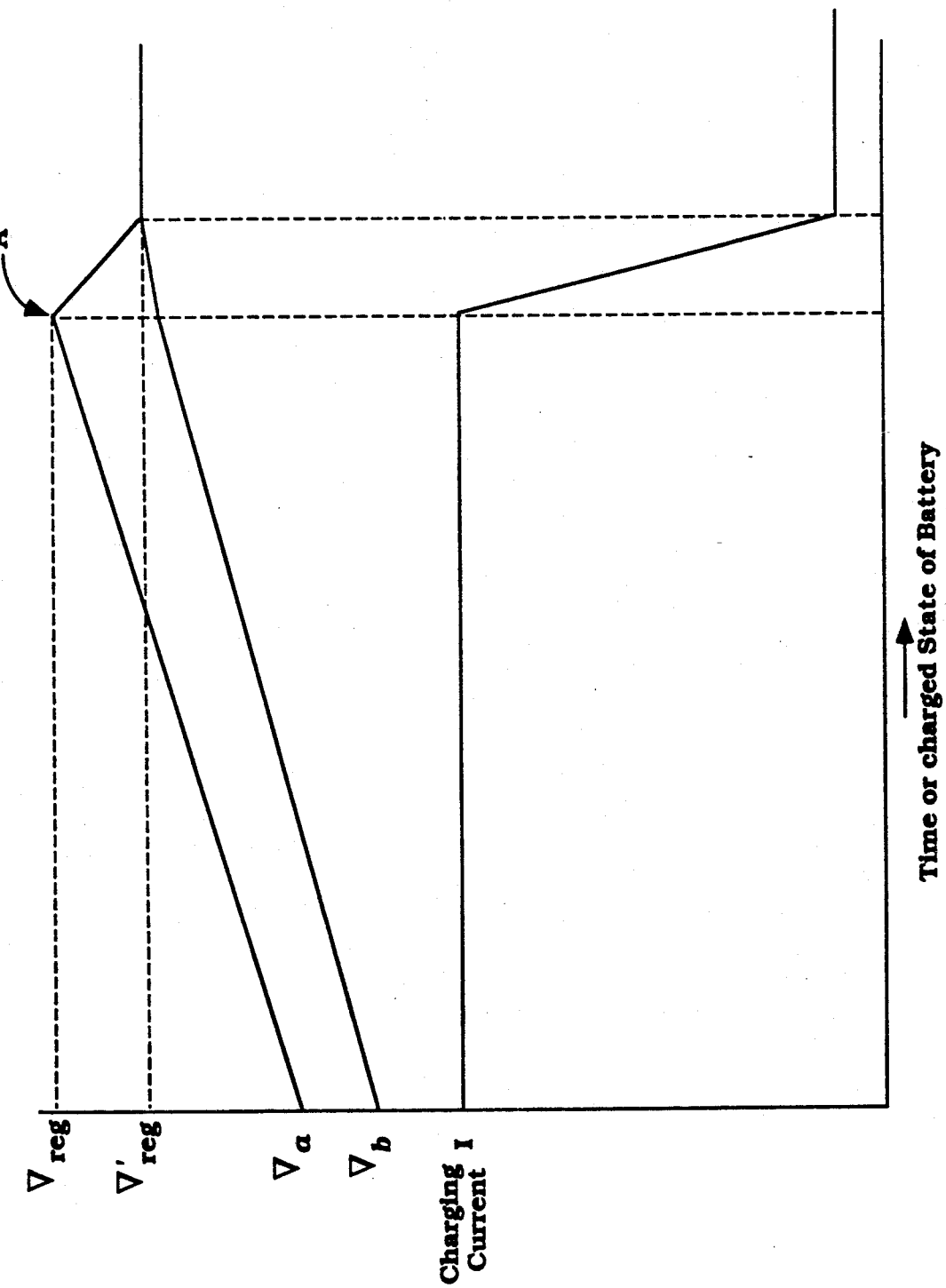
FIG. 3 is a graphic view, in part similar to FIG. 2, showing the operation of the illustrated embodiment of the invention.

The effect of this can be seen in FIG. 3 wherein it will be noted that the output voltage $V_a$ of the diode bridge 15 increases past the $V'_{reg}$ value until it reaches $V_{reg}$ at point A. Then, the voltage is dropped to the $V'_{reg}$ voltage. It will be seen that the battery is charged much quicker than in the prior art arrangements due to the increased regulated voltage to compensate for the voltage dropped through the cables 14.

The foregoing description is that of a preferred embodiment of the invention including a full wave rectification full wave regulator type of device. Of course, the invention can be utilized in conjunction with other types of regulators, as should be readily apparent to those skilled in the art, without departing from the spirit and scope of the invention, as defined by the appended claims

We claim:

1. A system for charging a battery from a generator comprising a rectifier regulator for rectifying and regulating the voltage from said generator to charge the battery, cable means interconnecting the output of said rectifier regulator to the battery, said rectifier regulator comprising means for measuring the output voltage of said rectifier regulator, means for measuring the charging current in said cable and means, responsive to inputs received from said output voltage measuring means and from said charging current measuring means, for increasing the voltage output of said rectifier regulator to compensate for the voltage drop in said cable for decreasing the time required to bring the battery to a full state of charge.

2. A system as set forth in claim 1 wherein said rectifier regulator further comprises a diode bridge the output of which is connected to the input of said charging current measuring means and wherein the means for increasing the voltage output of the rectifier regulator comprises a trigger voltage control circuit and a trigger circuit, responsive to said trigger voltage control circuit, for increasing the voltage at which said trigger circuit controlling the output voltage of said diode bridge of the rectifier is switched.

3. A system as set forth in claim 1 wherein the output voltage of said rectifier regulator is increased by an amount of the voltage drop in the cable.

4. A system for charging a battery as set forth in claim 1 in combination with an internal combustion engine and wherein the generator comprises a magneto generator driven by the internal combustion engine.

5. A system for charging a battery as set forth in claim 4 in further combination with a watercraft and wherein the internal combustion engine is positioned for powering the watercraft.

* * * * *